(12) United States Patent
Ahn et al.

(10) Patent No.: US 7,196,126 B2
(45) Date of Patent: Mar. 27, 2007

(54) THERMOPLASTIC FLAME RETARDANT RESIN COMPOSITIONS

(75) Inventors: Sung Hee Ahn, Seoul (KR); Jae Ho Yang, Gyeonggi-do (KR); Young Gil Jang, Seoul (KR); Su Hak Bae, Seoul (KR)

(73) Assignee: Cheil Industries Inc., Gyeongsangbuk-do (KR)

( * ) Notice: Subject to any disclaimer, the term of this patent is extended or adjusted under 35 U.S.C. 154(b) by 0 days.

(21) Appl. No.: 10/511,394

(22) PCT Filed: Apr. 14, 2003

(86) PCT No.: PCT/KR03/00749

§ 371 (c)(1),
(2), (4) Date: Oct. 15, 2004

(87) PCT Pub. No.: WO03/089513

PCT Pub. Date: Oct. 30, 2003

(65) Prior Publication Data

US 2005/0148708 A1 Jul. 7, 2005

(30) Foreign Application Priority Data

Apr. 16, 2002 (KR) .................. 10-2002-0020639

(51) Int. Cl.
*C08K 5/526* (2006.01)
(52) U.S. Cl. .................. 524/127; 524/140; 524/141; 524/145
(58) Field of Classification Search ............... 524/127, 524/140–141, 145
See application file for complete search history.

(56) References Cited

U.S. PATENT DOCUMENTS

| | | | |
|---|---|---|---|
| 3,383,435 A | | 5/1968 | Cizek |
| 3,639,506 A | | 2/1972 | Haaf |
| 3,883,613 A | | 5/1975 | Cooper |
| 4,360,618 A | * | 11/1982 | Trementozzi ............... 524/141 |
| 4,526,917 A | | 7/1985 | Axelrod |
| 4,578,423 A | | 3/1986 | Deets et al. |
| 4,599,380 A | * | 7/1986 | Ueda et al. ................... 525/68 |
| 4,966,814 A | * | 10/1990 | Ohzeki ........................ 428/457 |
| 6,107,440 A | * | 8/2000 | Hachiya et al. .............. 528/196 |
| 6,130,282 A | * | 10/2000 | Imahashi et al. ........... 524/436 |
| 6,646,032 B2 | | 11/2003 | Jang et al. |
| 6,716,900 B2 | | 4/2004 | Jang et al. |
| 6,838,497 B2 | | 1/2005 | Hong et al. |
| 2005/0228131 A1 | | 10/2005 | Jang et al. |

FOREIGN PATENT DOCUMENTS

| | | | |
|---|---|---|---|
| EP | 0 359 469 A2 | | 3/1990 |
| EP | 1 069 1587 A1 | | 1/2001 |
| JP | 06-128413 | * | 5/1994 |
| JP | 07-048491 | | 2/1995 |
| JP | 08-259796 | | 10/1996 |
| JP | 09-137032 | | 5/1997 |
| JP | 9-183886 | | 9/1997 |
| KR | 2001-55739 | | 7/2001 |
| KR | 2001-107434 | | 12/2001 |

OTHER PUBLICATIONS

Abstract of JP Laid Open Application 9-183886 published Jul. 15, 1997.
Abstract of Korea Laid Open Application 2001-107434 published Dec. 7, 2001.
Abstract of Korea Laid Open Application 2001-55739 published Jul. 4, 2001.
Abstract of German Patent Application DE 198 60 509 published Mar. 9, 2000.
Abstract of JP Laid Open Application 07-048491 published Feb. 21, 1995.
Abstract of JP Laid Open Application 08-259796 published Oct. 8, 1996.
Abstract of JP Laid Open Application 09-137032 published May 27, 1997.

* cited by examiner

*Primary Examiner*—Peter Szekely
(74) *Attorney, Agent, or Firm*—Maria Parrish Tungol

(57) ABSTRACT

A thermoplastic flame retardant resin composition according to the present invention comprises: (A) about 40~95 parts by weight of a styrenic resin; (B) about 5~60 parts by weight of a polyphenylene ether, (C) about 0.1~40 parts by weight of a rubber modified polystyrene resin containing about 40~65% by weight of a rubber and about 0.1~8% by weight of acrylonitrile based on 100 parts by weight of the sum of (A) and (B); and (D) about 5 to 30 parts by weight of an aromatic phosphoric acid ester compound based on 100 parts by weight of the sum of (A) and (B).

18 Claims, No Drawings

THERMOPLASTIC FLAME RETARDANT RESIN COMPOSITIONS

FIELD OF THE INVENTION

The present invention relates to a thermoplastic flame retardant resin composition. More particularly, the present invention relates to a thermoplastic flame retardant resin that comprises a styrenic resin and polyphenylene ether as a base resin, a rubber modified polystyrene resin containing 0.1–8% by weight of acrylonitrile in the polystyrene resin excluding rubber, and an aromatic phosphoric acid ester as a flame retardant.

BACKGROUND OF THE INVENTION

Polyphenylene ether resin has good thermal resistance, high impact strength, and good dimensional stability. Accordingly, the resin has been widely applied for common uses. However, the disadvantage could be observed that the polyphenylene ether resin has poor processability due to its excessively high thermal resistance. For this reason, the polyphenylene ether resin is blended with a rubber-modified styrenic resin or a styrenic resin to improve processability for use of electronic appliances such as personal computers, facsimiles, and the like. Further, in case that a blend of a polyphenylene ether and a rubber modified styrene-containing resin is applied to the fields of electric or electronic goods, flame-retardant property should be given to the resin.

A widely known method for giving the flame retardant property is that a halogen-containing compound or an antimony-containing compound is added to a rubber modified styrene-containing resin. However, the disadvantages could be observed that the halogen-containing compound results in the corrosion of the mold itself by the hydrogen halide gases released during the molding process and is fatally harmful due to the toxic gases liberated in case of fire.

Especially, since polybromodiphenyl ether, mainly used for a halogen containing flame retardant, can produce toxic gases such as dioxin or furan during combustion, flame-retardants that are prepared without a halogen-containing compound have become a major concern in this field.

It is commonly a known method to apply a phosphorus or nitrogen compound as halogen-free flame retardant to a resin composition. However, usage of only a phosphorus compound deteriorates heat resistance of a rubber modified styrene-containing resin and does not impart sufficient flame retardant property.

Generally, when a rubber modified styrene-containing resin such as ABS is burned; a char is not produced due to decomposition and vaporization in most parts (*Journal of Applied Polymer Science,* 1998, vol 68, p 1067). Therefore, to impart an effect of flame retardancy, it is necessary to add a char-forming agent such as polycarbonate or polyphenylene ether resin to a resin composition, which plays a role in prohibiting entrance of oxygen and emission of fuel by forming char on the surface of rubber with three-dimensional carbon bonds under combustion.

Aromatic phosphoric ether is commonly used to give the flame retardancy to the blend.

Japanese Patent Laid-open No. 7-48491 discloses a flameproof thermoplastic resin, made of adding a novolac phenolic resin as a char-forming agent and a phosphoric acid ester as a flame retardant into a thermoplastic copolymer resin composed of a rubber copolymer and an aromatic vinyl monomer. It was found that in order to obtain a good property of flame retardancy, a phenolic resin as a char-forming agent and a phosphoric acid ester compound as a flame retardant should be added in a lot of amount. However, in this case, the heat resistance of the resin composition is dropped suddenly.

In a blend of a polyphenylene ether and a rubber modified styrene-containing resin, the more the rubber modified styrene-containing resin is used, the lower the flame retardancy of the resin composition is getting. Thus, flame retardancy is almost lost when the rubber modified polystyrene is added more than the critical amount. If the amount of acrylonitrle-butadiene-styren copolymer or rubber modified polystyrene resin is increased in the blend of a polyphenylene ether and a rubber modified styrene-containing resin, a great amount of decomposition is produced from combustion, so that a char film is destroyed to decrease flame retardancy of the resin.

U.S. Pat. No. 3,639,506 discloses a resin composition using triphenyl phosphate (TPP) and a halogen-containing compound together as flame retardants for giving flame retardancy to a polyphenylene ether resin and a stryrenic resin. U.S. Pat. No. 3,883,613 discloses a resin composition using trimesityl phosphate as a flame retardant to a polyphenylene ether resin and a stryrenic resin. U.S. Pat. No. 4,526,917 discloses a resin composition using TPP and trimesityl phosphate as flame retardants.

Accordingly, the present inventors have developed a thermoplastic flame retardant resin composition which has a good appearance, flame-retardancy, and impact strength by adding acrylonitrile-rubber-styrene copolymer containing 0.1 to 8% by weight of acrylonitrile in the polystyrene resin excluding rubber to a blend of a rubber modified polystyrene resin and polyphenylene ether resin.

OBJECTS OF THE INVENTION

An object of the present invention is to provide a thermoplastic resin composition with good flame retardancy.

Another object of the present invention is to provide a thermoplastic flame retardant resin composition with good appearance and gloss.

A further object of the present invention is to provide a thermoplastic flame retardant resin composition with good impact strength.

A further object of the present invention is to provide a thermoplastic flame retardant resin composition with good molding property.

Other objects and advantages of this invention will be apparent from the ensuing disclosure and appended claims.

SUMMARY OF THE INVENTION

A thermoplastic flame retardant resin composition according to the present invention comprises (A) about 40 to 95 parts by weight of a styrenic resin; (B) about 5 to 60 parts by weight of a polyphenylene ether; (C) about 0.1 to 40 parts by weight of a rubber modified polystyrene resin containing about 40 to 65% by weight of a rubber and about 0.1 to 8% by weight of acrylonitrile in the polystyrene resin excluding rubber based on 100 parts by weight of the sum of (A) and (B); and (D) 5 to 30 parts by weight of an aromatic phosphoric acid ester compound based on 100 parts by weight of the sum of (A) and (B).

The detailed descriptions of components of the resin composition according to the present invention are as follows:

DETAILED DESCRIPTION OF THE INVENTION (A) Styrenic Resin

The styrenic resin of the present invention is prepared by a known method such as bulk polymerization, suspension polymerization, emulsion polymerization, or a combination thereof. In the present invention, polystyrene resin without rubber and rubber modified polystyrene resin can be used alone or in combination as a mixture.

The rubber modified polystyrene resin can be produced by thermal polymerization without an initiator, or in the presence of initiator such as benzoyl peroxide, t-butyl hydroperoxide, acetyl peroxide, cumen hydroperoxide, etc, by adding 80 to 99.5 parts by weight of one or more monomer(s) selected from a group consisting of styrene, N-substituted styrene and $\alpha$-alkyl styrene to 0.5 to 20 parts by weight of a rubber selected from the group consisting of butadiene, isoprene, copolymer of butadiene and styrene, and alkyl acrylate.

The polystyrene resin without rubber can be prepared by thermal polymerization without an initiator, or in the presence of an initiator such as benzoyl peroxide, t-butyl hydroperoxide, acetyl peroxide, or cumen hydroperoxide, by polymerizing one or more monomer(s) selected from the group consisting of styrene, N-substituted styrene and $\alpha$-alkyl styrene.

Preferably, the styrenic resin of the present invention is used in an amount of about 40 to 95 parts by weight, and more preferably 50 to 90 parts by weight.

(B) Polyphenylene Ether Resin

The Polyphenylene ether resin is employed as a base resin to improve flame retardancy, heat resistance and rigidity of the resin composition according to the present invention. As examples of the polyphenylene ether resin, poly(2,6-dimethyl-1,4-phenylene) ether, poly(2,6-diethyl-1,4-phenylene) ether, poly(2,6-dipropyl-1,4,-phenylene) ether, poly(2-methyl-6-ethyl-1,4-phenylene) ether, poly(2-methyl-6-propyl-1,4-phenyl) ether, poly(2-ethyl-6-propyl-1,4-phenylene) ether, poly(2,6-diphenyl-1,4-phenylene) ether, copolymer of poly (2,6-dimethyl-1,4-phenylene) ether and poly(2,3,6-trimethyl-1,4-phenylene) ether, and copolymer of poly(2,6-dimethyl-1,4-phenylene) ether and poly(2,3,5-triethyl-1,4-phenylene) ether can be used.

Preferably, copolymer of poly(2,6-dimethyl-1,4-phenylene) ether and poly(2,3,6-trimethyl-1,4-phenylene) ether, and poly(2,6-dimethyl-1,4-phenylene) ether are preferably used, more preferably poly(2,6-dimethyl-1,4-phenylene) ether is used.

The degree of polymerization of polyphenylene ether is not limited specifically, but considering heat-stability or processability of the resin composition, it is preferable that the intrinsic viscosity of polyphenylene ether is in the range of from 0.2 to 0.8 when measured in a chloroform solvent at 25° C.

The polyphenylene ether resin in this invention is preferably used in an amount of 5 to 60 parts by weight, more preferably 10 to 50 parts by weight.

(C) Rubber Modified Polystyrene Resin Containing about 0.1 to 8% by Weight of Acrylonitrile in the Polystyrene Resin Excluding Rubber The rubber modified polystyrene resin according to the present invention is a graft copolymer wherein rubber phase polymers are dispersed in the form of particles in a matrix obtained by graft-polymerizing monomer mixture onto rubber phase polymer. The rubber modified polystyrene resin is prepared by mixing an aromatic vinyl monomer and a vinyl group-containing monomer, which can be copolymerized therewith, in the presence of a rubbery phase polymer.

Such rubber-modified styrenic resin is prepared by a known method such as emulsion polymerization, suspension polymerization or bulk polymerization. In bulk polymerization, the grafted copolymer can be produced in one process. The content of rubber in the final rubber modified polystyrene resin to the total weight of a graft copolymer resin is preferably in 40 to 65% by weight. The examples of such resins are acrylonitrile-butadiene-styrene (ABS) copolymer resin, acrylonitrile-acryl rubber-styrene (AAS) copolymer resin, acrylonitrile-ethylenepropylene rubber-styrene copolymer resin, and so on.

The examples of the rubber for rubber-modified styrenic resin are diene rubbers such as polybutadiene, poly(styrene-butadiene), poly(acrylonitrile-butadiene), etc; a saturated rubber in which hydrogen is added to said diene-containing rubber; isoprene rubber; chloroprene rubber; a polyacrylic acid butyl; and a terpolymer of ethylene-propylene-diene (EPDM). It is preferable to use a diene-containing rubber, more preferably a butadiene-containing rubber. The content of rubber is preferably in the range of 40 to 65% by weight based on the total weight of a graft copolymer resin.

The examples of the aromatic vinyl monomer are styrene, $\alpha$-methyl styrene, p-methyl styrene, etc. In the above examples, styrene is the most preferable.

The examples of the vinyl group-containing monomer copolymerizable with aromatic vinyl monomer are cyanide vinyl group-containing compounds such as acrylonitrile and unsaturated nitrile-containing compounds such as methacrylonitrile.

In the present invention, the rubber modified polystyrene resin is composed of 40 to 65% by weight of rubber and 60 to 35% by weight of monomer mixture. The monomer mixture contains 92 to 99.9% by weight of aromatic vinyl monomer such as styrene and 0.1 to 8% by weight of unsaturated nitrile monomer. It is preferable that the monomer mixture contains 95 to 99.9% by weight of aromatic vinyl monomer and 0.1 to 5% by weight of unsaturated nirtile monomer.

In addition, in order to give good characteristics of processability and heat resistance, the monomers such as acrylic acid, methacryl acid, maleic anhydride and N-substituted maleimide can be added in the graft polymerization. The amounts of the monomers are less than 40 parts by weight based on 100 parts by weight of the graft copolymer resin.

To acquire good impact strength and appearance when said styrene-containing graft copolymer is prepared, the average size of rubber particles is preferably in the range of from 0.1 to 0.4 μm.

The content of the rubber modified polystyrene resin in the present invention is preferably 0.1 to 40 parts by weight per 100 parts by weight of the base resin. It is more preferable that the content of the rubber modified polystyrene resin is more preferably 10 to 40 parts by weight per 100 parts by weight of the base resin (D) Phosphoric Acid Ester Compound The phosphoric acid ester compound used in the present invention is a compound having the following structural formula (I):

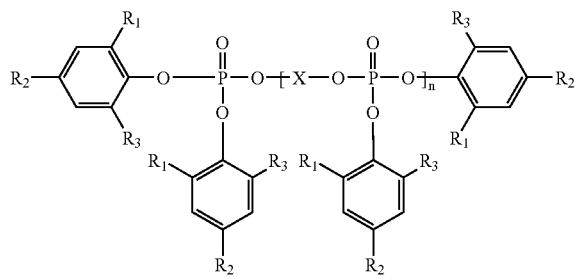

(I)

wherein $R_1$, $R_2$ and $R_3$ independently of one another are hydrogen or $C_{1-4}$ alkyl; X is a $C_{6-20}$ aryl group or alkyl-substituted $C_{6-20}$ aryl group that are derivatives from a dialcohol derivative such as resorcinol, hydroquinol, bisphenol-A and bisphenol-S; and n is 0~4.

Where n is 0, the compound represented in the structural formula (I) is triphenyl phosphate, tricresyl phosphate, trixylenyl phosphate, tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, and the like, and where N is 1, the compounds include resorcinolbis(diphenyl) phosphate, resorcinolbis(2,6-dimethyl phenyl) phosphate, resorcinolbis(2,4-ditertiary butyl phenyl) phosphate, hydroquinolbis(2,6-dimethyl phenyl) phosphate, hydroquinolbis(2,4-ditertiary butyl phenyl) phosphate, and the like. The compounds can be used alone or in combination therewith.

In the present invention, the phosphoric acid ester compound as a flame retardant is used in the amount of 5 to 30 parts by weight per 100 parts by weight of the base resin (A)+(B).

Other additives may be contained in the resin composition of the present invention. The additives include an anti-dripping agent, an impact modifier, inorganic filler, a heat stabilizer, an anti-oxidant, a light stabilizer, a pigment, and/or dye. Inorganic filler is such as talc, silica, glass fiber, ceramics, a carbonate, and a sulphate. The additives are employed in the amount of 0 to 50 parts by weight on the basis of 100 parts by weight of the base resin.

The invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES

The components to prepare flameproof thermoplastic resin compositions in Examples 1–5 and Comparative Examples 1–5 are as follows:

(A) Styrenic Resin (A$_1$) Polystyrene (GPPS)

GPPS by Cheil Industry Co. of Korea (product name: HF-2680) was used.

(A$_2$) Rubber Modified Styrene-Containing Resin (HIPS)

Rubber modified polystyrene resin by Cheil Industry Co. of Korea (product name: HG-1760S) was used.

(B) Polyphenylene Ether (PPE)

Poly(2,6-dimethyl-phenyl ether) by Asahi Kasei Co. of Japan (product name: P-402) was used.

(C) Rubber Modified Polystyrene Resin (C$_1$) Rubber Modified Polystyrene Resin 50 parts of butadiene rubber latex powder, 48.5 parts of styrene, 1.5 parts of acrylonitrile, and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain g-ABS latex. To the g-ABS latex, 0.4 parts of sulfuric acid was added, coagulated and dried to obtain rubber modified polystyrene resin (g-ABS) in a powder form.

(C$_2$) Rubber Modified Polystyrene Resin 50 parts of butadiene rubber latex powder, 47.5 parts of styrene, 2.5 parts of acrylonitrile, and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain g-ABS latex. To the g-ABS latex, 0.4 parts of sulfuric acid was added, coagulated and dried to obtain rubber modified polystyrene resin (g-ABS) in a powder form.

(C$_3$) Rubber Modified Polystyrene Resin 50 parts of butadiene rubber latex powder, 46.5 parts of styrene, 3.5 parts of acrylonitrile, and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain g-ABS latex. To the g-ABS latex, 0.4 parts of sulfuric acid was added, coagulated and dried to obtain rubber modified polystyrene resin (g-ABS) in a powder form.

(D) Phosphoric Acid Ester Compound

Triphenylphosphate (TPP) with a melting point of 48° C. was used.

(E) Rubber Modified Polystyrene Resin (ABS Resin)

(E$_1$) Acrylonitrile-Butadiene-Styrene Copolymer Resin (g-ABS Resin)

50 parts of butadiene rubber latex powder, 36 parts of styrene, 14 parts of acrylonitrile, and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain g-ABS latex. To the g-ABS latex, 0.4 parts of sulfuric acid was added, coagulated and dried to obtain acrylonitrile-butadiene-styrene graft copolymer resin (g-ABS) in a powder form.

(E$_2$) Butadiene-Styrene Resin (g-BS Resin)

50 parts of butadiene rubber latex powder, 50 parts of styrene and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain g-ABS latex. To the g-ABS latex, 0.4 parts of sulfuric acid was added, coagulated and dried to obtain butadiene-styrene graft copolymer resin (g-BS) in a powder form.

Examples 1~5

The components as shown in Table 1 were blended and extruded in the form of pellets with a twin-screw extruder at 200~280° C. The pellets were dried at 80° C. for 3 hours and extruded into test specimens in a 6 oz. extruder at molding temperature of 220~280° C. and barrel temperature of 40~80° C., and the resin pellets were molded into test specimens.

Comparative Examples 1~5

The Comparative Examples 1 was conducted in the same manner as in Example 4, except that the rubber modified polystyrene resin ($C_1$) was not used.

The Comparative Examples 2 was conducted in the same manner as in Example 5, except that the rubber modified polystyrene resin ($C_1$) was not used.

The Comparative Examples 3 was conducted in the same manner as in Example 1, except that the rubber modified polystyrene resin ($C_1$) was not used.

The Comparative Examples 4 was conducted in the same manner as in Comparative Examples 3, except that g-ABS resin ($E_1$) was used.

The Comparative Examples 5 was conducted in the same manner as in Comparative Examples 3, except that g-BS resin ($E_2$) was used.

Measurement of Physical Properties:

(1) Flame Retardancy

The flame retardancy was measured in accordance with UL94VB with a thickness of 1/10" and 1/12".

(2) Impact Strength

Impact strength was measured according to Izod impact strength ASTM D-256 (1/8" notched).

(3) Vicat Softening temperature (VST)

Vicat softening temperature was measured in accordance with ASTM D-1525 under load of 1 kg.

(4) Melt Flow Index

Melt flow index (g/10 min) was measured in accordance with ASTM D-1238 at 220° C. and 10 kg load.

(5) Appearance

Appearance was evaluated by use of a score of test specimens prepared by injecting pellets at 200° C.~280° C. with a 65 degrees viewing angle. The pellets was prepared from a rectangular plate mold of 50 mm×200 mm×2 mm with a gate having a diameter of 2 mm which was 30 mm away from a central portion of one of the ends thereof.

TABLE 1

|  |  | Examples | | | | | Comparative Examples | | | | |
|---|---|---|---|---|---|---|---|---|---|---|---|
|  |  | 1 | 2 | 3 | 4 | 5 | 1 | 2 | 3 | 4 | 5 |
| (A) | ($A_1$) GPPS | 35 | 35 | 35 | 70 | — | 70 | — | 35 | 35 | 35 |
|  | ($A_2$) HIPS | 35 | 35 | 35 | — | 70 | — | 70 | 35 | 35 | 35 |
| (B) | PPE resin | 30 | 30 | 30 | 30 | 30 | 30 | 30 | 30 | 30 | 30 |
| (C) | ($C_1$) | 20 | — | — | 20 | 20 | — | — | — | — | — |
|  | ($C_2$) | — | 20 | — | — | — | — | — | — | — | — |
|  | ($C_3$) | — | — | 20 | — | — | — | — | — | — | — |
| (D) | Phosphoric acid ester | 15 | 15 | 15 | 15 | 15 | 15 | 15 | 15 | 15 | 15 |
| (E) | ($E_1$) | — | — | — | — | — | — | — | — | 20 | — |
|  | ($E_2$) | — | — | — | — | — | — | — | — | — | 20 |
|  | Izod Impact Strength (1/8") | 29 | 30 | 24 | 23 | 33 | 8 | 11 | 9 | 8 | 23 |
|  | VST | 95 | 95 | 95 | 96 | 93 | 95 | 96 | 89 | 98 | 93 |
|  | Melt Flow Index | 31 | 30 | 30 | 33 | 31 | 35 | 32 | 33 | 24 | 25 |
|  | UL 94(1/10") | 5 V | 5 V | 5 V | 5 V | 5 V | 5 V | FAIL | 5 V | FAIL | FAIL |
|  | UL 94(1/12") | 5 V | 5 V | 5 V | 5 V | 5 V | FAIL | FAIL | FAIL | FAIL | FAIL |
|  | Average of overall combustion time (SEC, 1/10") | 36 | 34 | 36 | 34 | 38 | 49 | 67 | 55 | — | — |
|  | Appearance | 90 | 90 | 88 | 94 | 90 | 95 | 60 | 70 | 86 | 89 |

As shown in the table 1, the resin composition of the present invention had good impact strength and appearance due to rubber modified polystyrene resin (C) Further, flame retardancy was also enhanced. Comparative Examples 1~5 not employing the component (C) showed much lower impact strength, appearance and flame retardancy in comparison with the Examples.

The present invention can be easily carried out by an ordinary skilled person in the art. Many modifications and changes may be deemed to be with the scope of the present invention as defined in the following claims.

What is claimed is:

1. A thermoplastic flame retardant resin composition comprising:

(A) about 40 to 95 parts by weight of a styrenic resin selected from the group consisting of styrenic resin consisting of styrenic monomeric units without rubber, rubber modified styrenic resin wherein the styrenic portion consists of styrenic monomeric units and a mixture thereof, wherein said rubber modified styrenic resin is produced by polymerizing 80 to 99.5 parts by weight of one or more monomer(s) selected from the group consisting of styrene, N-substituted styrene, and α-alkyl styrene to 0.5 to 20 parts by weight of a rubber selected from the group consisting of butadiene, isoprene, copolymer of butadiene and styrene, and alkyl acrylate;

(B) about 5 to 60 parts by weight of a polyphenylene ether;

(C) about 0.1 to 40 parts by weight of a rubber modified styrenic graft copolymer resin based on 100 parts by weight of the sum of (A) and (B) wherein said rubber modified graft copolymer resin is comprised of about 40 to 65% by weight of a rubber and 60 to 35% by weight of a styrenic copolymer resin which contains about 0.1 to 8% by weight of acrylonitrile or methacrylonitrile and about 92 to 99.9% styrenic monomer excluding rubber; and (D) about 5 to 30 parts by weight of a phosphorous-containing compound flame retardant wherein the phosphorous-containing compound flame retardant in the thermoplastic flame retardant resin composition consists of an aromatic phosphoric acid ester compound based on 100 parts by weight of the sum of (A) and (B).

2. The thermoplastic flame retardant resin composition as defined in claim 1, wherein said styrenic resin (A) is polystyrene.

3. The thermoplastic flame retardant resin composition as defined in claim 1, wherein said styrenic resin (A) is a rubber modified polystyrene resin.

4. The thermoplastic flame retardant resin composition as defined in claim 1, wherein said styrenic copolymer resin contains about 0.1 to 8% by weight of acrylonitrile excluding rubber.

5. The thermoplastic flame retardant resin composition as defined in claim 1, wherein said styrenic copolymer resin contains about 0.1 to 8% by weight of methacrylonitrile excluding rubber.

6. The thermoplastic flame retardant resin composition as defined in claim 1, wherein said styrenic copolymer resin further comprises less than 40 parts by weight of a monomer selected from the group consisting of acrylic acid, methacrylate, maleic anhydride, and N-substituted maleimide, per 100 parts by weight of said rubber modified styrenic resin.

7. The thermoplastic flame retardant resin composition as defined in claim 1, wherein said styrenic copolymer resin contains 0.1 to 5% by weight of acrylonitrile excluding rubber.

8. The thermoplastic flame retardant resin composition as defined in claim 1, wherein said styrenic copolymer resin contains 0.1 to 5% by weight of methacrylonitrile excluding rubber.

9. The thermoplastic flame retardant resin composition as defined in claim 1, wherein the styrenic monomer of (C) is styrene, α-methyl styrene, or p-methyl styrene.

10. The thermoplastic flame retardant resin composition as defined in claim 1, wherein said styrenic monomer is styrene.

11. The thermoplastic flame retardant resin composition as defined in claim 1, wherein said aromatic phosphoric acid ester is represented by following formula (I):

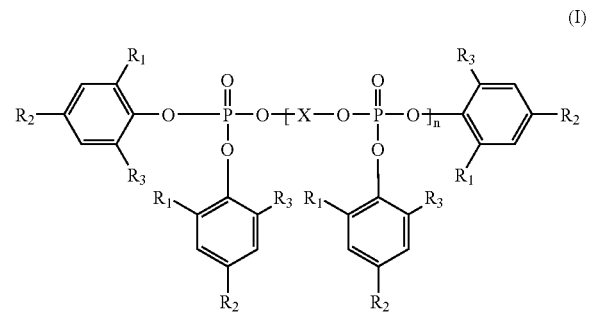

wherein $R_1$, $R_2$ and $R_3$ independently of one another are hydrogen or $C_{1-4}$ alkyl; X is a $C_{6-20}$ aryl group or alkyl-substituted $C_{6-20}$ aryl group that are derivatives from a dialcohol derivative wherein the dialcohol derivative is resorcinol, hydroquinol, bisphenol-A or bisphenol-S; and n is 0~4.

12. The thermoplastic flame retardant resin composition as defined in claim 1, further comprising an anti-dripping agent, an impact modifier, an inorganic filler, a heat stabilizer, an anti-oxidants, a light stabilizer, a pigment, and/or dye.

13. A thermoplastic flame retardant resin composition comprising:
(A) about 40 to 95 parts by weight of a styrenic resin selected from the group consisting of polystyrene resin, rubber modified polystyrene resin and a mixture thereof;
(B) about 5 to 60 parts by weight of a polyphenylene ether;
(C) about 0.1 to 40 parts by weight of a rubber modified polystyrene copolymer resin based on 100 parts by weight of the sum of (A) and (B) wherein said rubber modified polystyrene graft copolymer resin is comprised of about 40 to 65% by weight of a rubber and 60 to 35% by weight of a polystyrene copolymer resin which contains about 0.1 to 8% by weight of acrylonitrile and about 92 to 99.9% of styrene excluding rubber; and
(D) about 5 to 30 parts by weight of a phosphorous-containing compound flame retardant wherein the phosphorous containing compound flame retardant in the resin composition consists of an aromatic phosphoric acid ester compound based on 100 parts by weight of the sum of (A) and (B).

14. The thermoplastic flame retardant resin composition as defined in claim 13, wherein said polystyrene copolymer resin contains 0.1 to 5% by weight of acrylonitrile and about 95 to 99.9% by weight of styrene excluding rubber.

15. A thermoplastic flame retardant resin composition comprising:
(A) about 40 to 95 parts by weight of a styrenic resin which consists of styrenic monomeric units;
(B) about 5 to 60 parts by weight of a polyphenylene ether;
(C) about 0.1 to 40 parts by weight of a rubber modified styrenic graft copolymer resin based on 100 parts by weight of the sum of (A) and (B) wherein said rubber modified graft copolymer resin is comprised of about 40 to 65% by weight of a rubber and 60 to 35% by weight of a styrenic copolymer resin which contains about 0.1 to 8% by weight of acrylonitrile or methacrylonitrile and about 92 to 99.9% styrenic monomer excluding rubber; and
(D) about 5 to 30 parts by weight of a phosphorous-containing compound flame retardant wherein the phosphorous-containing compound flame retardant consists of an aromatic phosphoric acid ester compound based on 100 parts by weight of the sum of (A) and (B).

16. The thermoplastic flame retardant resin composition as defined in claim 15, wherein said styrenic monomeric units are styrene, N-substituted styrene, or α-alkyl styrene monomeric units.

17. The thermoplastic flame retardant resin composition as defined in claim 15, wherein said styrenic resin (A) is polystyrene resin.

18. The thermoplastic flame retardant resin composition as defined in claim 15, wherein said rubber modified graft copolymer resin is comprised of about 40 to 65% by weight of a rubber having an average particle size of from 0.1 to 0.4 μm and 60 to 35% by weight of a styrenic copolymer resin which contains about 0.1 to 8% by weight of acrylonitrile or methacrylonitrile and about 92 to 99.9% of styrenic monomer excluding rubber.

* * * * *